(12) United States Patent
Zaum et al.

(10) Patent No.: US 10,493,706 B2
(45) Date of Patent: Dec. 3, 2019

(54) DEVICE FOR SEALING AND INFLATING INFLATABLE OBJECTS

(71) Applicant: Continental Reifen Deutschland GmbH, Hannover (DE)

(72) Inventors: Christopher Zaum, Seelze (DE); Rainer Detering, Neustadt am Rbge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 336 days.

(21) Appl. No.: 15/126,591

(22) PCT Filed: Jan. 16, 2015

(86) PCT No.: PCT/EP2015/050723
§ 371 (c)(1),
(2) Date: Sep. 16, 2016

(87) PCT Pub. No.: WO2015/139855
PCT Pub. Date: Sep. 24, 2015

(65) Prior Publication Data
US 2017/0087783 A1 Mar. 30, 2017

(30) Foreign Application Priority Data
Mar. 19, 2014 (DE) .................. 10 2014 205 071

(51) Int. Cl.
*B29C 73/16* (2006.01)
*F04B 49/16* (2006.01)
(Continued)

(52) U.S. Cl.
CPC ............ *B29C 73/166* (2013.01); *F04B 13/02* (2013.01); *F04B 27/16* (2013.01); *F04B 35/06* (2013.01);
(Continued)

(58) Field of Classification Search
None
See application file for complete search history.

(56) References Cited

U.S. PATENT DOCUMENTS 2,761,615 A * 9/1956 Prince ..................... F04B 49/10
417/274
3,885,892 A * 5/1975 Dwyer .................... F04B 35/04
417/234
(Continued)

FOREIGN PATENT DOCUMENTS

CN 101446279 A 6/2009
DE 19850269 A1 5/2000
(Continued)

OTHER PUBLICATIONS

PCT/EP2015/050723 the International Search Report and the Written Opinion of the International Searching Authority dated Apr. 23, 2015.
(Continued)

*Primary Examiner* — Jacob T Minskey
*Assistant Examiner* — Baileigh Kate Darnell
(74) *Attorney, Agent, or Firm* — David L. Cate; Gregory Adams

(57) ABSTRACT

Devices for sealing and inflating inflatable objects, in particular for sealing and inflating motor vehicle tires, wherein the devices have as a source of compressed gas a compressor unit, which is formed as a reciprocating piston compressor driven by a slider crank mechanism and has a piston moved in an oscillating manner in a cylinder, and wherein the piston and the cylinder delimit a compression chamber and the cylinder is closed on the output side by a cylinder head with an outlet valve.

9 Claims, 1 Drawing Sheet

(51) Int. Cl.
 F04B 35/06 (2006.01)
 F04B 13/02 (2006.01)
 F04B 27/16 (2006.01)
 F04B 53/00 (2006.01)
 F04B 53/10 (2006.01)
 F04B 53/14 (2006.01)
 B29L 30/00 (2006.01)

(52) U.S. Cl.
 CPC ............ *F04B 49/16* (2013.01); *F04B 53/006* (2013.01); *F04B 53/007* (2013.01); *F04B 53/108* (2013.01); *F04B 53/143* (2013.01); *B29L 2030/00* (2013.01)

(56) References Cited

U.S. PATENT DOCUMENTS

| | | | | |
|---|---|---|---|---|
| 4,231,720 | A * | 11/1980 | Konig | F04B 13/02 417/379 |
| 4,874,296 | A * | 10/1989 | Moynihan | F04B 9/02 417/234 |
| 5,368,582 | A * | 11/1994 | Bertera | A61F 9/0008 347/1 |
| 6,257,838 | B1 * | 7/2001 | Schlossarczyk | F04B 39/08 417/275 |
| 6,913,159 | B1 * | 7/2005 | Goldberg | B65D 23/106 215/395 |
| 7,547,201 | B2 * | 6/2009 | Chou | B29C 73/166 277/438 |
| 8,746,293 | B2 * | 6/2014 | Chou | B60S 5/04 141/38 |
| 2002/0131868 | A1 * | 9/2002 | Joo | F04B 35/04 417/53 |
| 2008/0029181 | A1 * | 2/2008 | Marini | B29C 73/166 141/38 |
| 2008/0145244 | A1 * | 6/2008 | Detering | F04B 35/04 417/415 |
| 2008/0145245 | A1 * | 6/2008 | Chou | B29C 73/166 417/415 |
| 2008/0277044 | A1 * | 11/2008 | Marini | B29C 73/166 156/97 |
| 2009/0056850 | A1 * | 3/2009 | Yanagi | F04B 41/02 152/504 |
| 2009/0107578 | A1 * | 4/2009 | Trachtenberg | B05B 9/0805 141/5 |
| 2009/0139604 | A1 * | 6/2009 | Lolli | B29C 73/166 141/38 |
| 2009/0196766 | A1 * | 8/2009 | Detering | F04B 39/123 417/63 |
| 2009/0218005 | A1 * | 9/2009 | Stehle | B29C 73/166 141/38 |
| 2009/0301602 | A1 * | 12/2009 | Lolli | B29C 73/166 141/38 |
| 2010/0005930 | A1 * | 1/2010 | Lolli | B29C 73/166 81/15.5 |
| 2010/0040484 | A1 | 2/2010 | Shade et al. | |
| 2010/0108187 | A1 * | 5/2010 | Lolli | B29C 73/166 141/38 |
| 2011/0011217 | A1 * | 1/2011 | Kojima | B29C 73/166 81/15.2 |
| 2012/0247319 | A1 * | 10/2012 | Kimoto | F04B 27/16 92/12.2 |
| 2013/0000777 | A1 * | 1/2013 | Kojima | B29C 73/166 141/38 |
| 2013/0092286 | A1 * | 4/2013 | Chou | B60S 5/04 141/38 |
| 2013/0199666 | A1 * | 8/2013 | Nakao | B29C 73/166 141/38 |
| 2013/0280517 | A1 | 10/2013 | Buehring et al. | |
| 2015/0110657 | A1 * | 4/2015 | Spiegl | F04B 49/16 417/546 |

FOREIGN PATENT DOCUMENTS

| | | |
|---|---|---|
| EP | 2058112 A1 | 5/2009 |
| EP | 2396165 A1 | 12/2011 |
| EP | 2497628 A1 | 9/2012 |
| EP | 2657007 A1 | 10/2013 |
| JP | H0411286 A | 1/1992 |
| JP | 2012172529 A | 9/2012 |

OTHER PUBLICATIONS

CN Office Action dated May 2, 2017 of corresponding international application PCT/EP2015/050723.
JP Office Action dated Aug. 31, 2017 of international application PCT/EP2015/050723 on which this application is based.

* cited by examiner

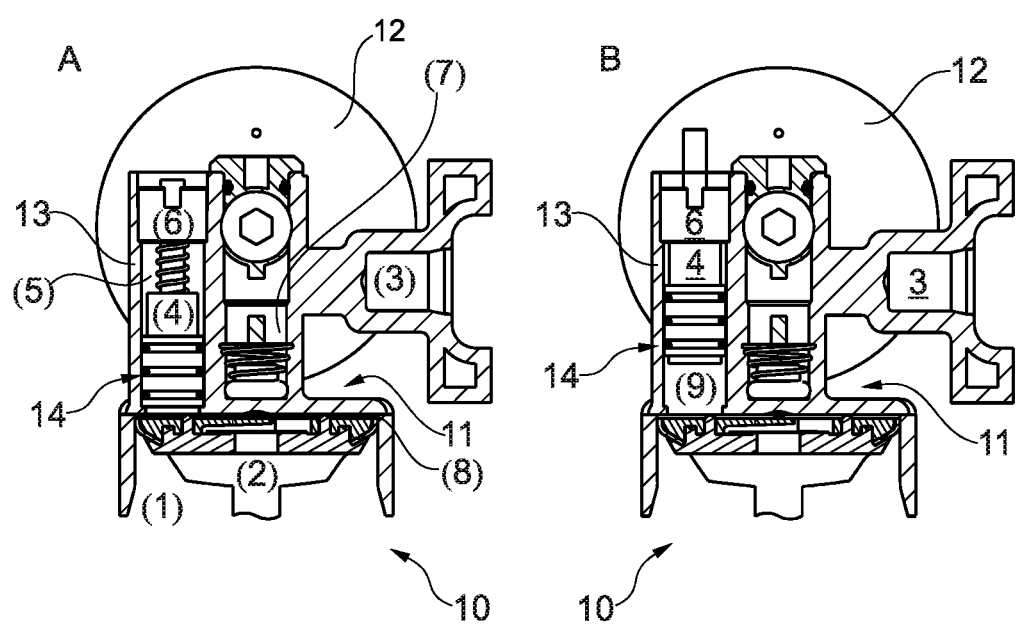

DEVICE FOR SEALING AND INFLATING INFLATABLE OBJECTS

CROSS REFERENCE TO RELATED APPLICATIONS

This application is a continuation application of international patent application PCT/EP2015/050723, filed Jan. 16, 2015, designating the United States and claiming priority from German patent application 10 2014 205 071.5, filed Mar. 19, 2014, and the entire content of these applications is incorporated herein by reference.

FIELD

The invention relates to a device for sealing and inflating inflatable objects, in particular for sealing and inflating motor vehicle tires.

BACKGROUND

This section provides background information to facilitate a better understanding of the various aspects of the disclosure. It should be understood that the statements in this section of this document are to be read in this light, and not as admissions of prior art.

Devices for sealing and inflating inflatable objects are required, in particular for puncture repair kits, which are arranged in the motor vehicle and carried by it in place of a spare tire.

In the case of such puncture repair kits for the temporary repair of tire punctures, in which the compressor units, i.e. the air compressors for filling a damaged tire, usually by way of a valve-and-distributor unit for sealant and compressed gas, are connected to the tire to be repaired, the valve-and-distributor unit also has a connector for the connection of a sealant container. For sealing the damaged tire, the sealant is then fed by the air compressor into the tire by way of the valve-and-distributor unit and after that the tire is inflated by the air compressor up to a certain minimum pressure.

The compressor units, i.e. the air compressors, are usually produced partly or completely from plastic or similar low-cost materials. One of the most important technical challenges with this type of production is that the materials used have a temperature resistance that is limited, and lower in comparison with a metal, and have a low thermal conductivity.

Without implementing special protective measures, the heating of the air compressor that is caused by the compression/compression process may lead to thermal overloading of system components. This is the case in particular when there is prolonged uninterrupted use. Thermal overloading is most likely to occur here when the compressor is operated near its mechanical or electrical loading limit, for example when it pumps against maximum pressure over a prolonged time, when for instance air and viscous sealant are being fed into the tire through the tire valve.

In order to prevent such overloading in all operating states, in the prior art system components that are particularly at risk, such as for example the cylinder head in an air compressor formed as a reciprocating piston compressor, are produced from metal. However, this method leads to significantly increased production costs.

Another possibility is to permanently limit the power of the compressor. However, in terms of its application, this method leads to oversized air compressors, and therefore also significantly increases the production costs.

It is similarly possible to limit the temperature of system components that are at risk by means of active cooling, for example by fans. However, on account of the low thermal conductivity, this method can only be used to a qualified extent in the case of plastic components.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure are devices for sealing and inflating inflatable objects, which include a source of compressed gas and a compressor unit, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve. The reciprocating piston compressor is provided with a variable dead air volume, the content of which can be varied depending on the temperature of the cylinder head. The dead air volume may be provided by a pressure chamber which is connected to the compression chamber and the content of which can be varied depending on the temperature of the cylinder head.

In some aspects, the devices further include a pressure gage and a reservoir for an automatic sealant that can be filled into the inflatable object and a valve-and-distributor unit for sealant and compressed gas, which connects the reservoir and the compressor unit and has a line that can be connected to the inflatable object. A further pressure chamber in the form of a second cylinder may be arranged in a guided, temperature-dependently displaceable piston slide valve. The piston slide valve, in some cases, may be actuated by an actuator of a shape memory alloy. The piston slide valve in some cases can be displaced by an actuator that is actuated with the aid of a thermobimetal element. Also, the piston slide valve can be actuated by an electrical or electromechanical actuator, which is controlled by a monitoring unit that can be activated by way of temperature sensors.

In some embodiments, the compressed gas flows from the compression chamber into the pressure chamber in a damped manner. The damping may be produced by the piston slide valve being frictionally displaced in a second cylinder. Also, the damping may produced by the piston slide valve being formed with sealing rings that are arranged between the inner wall of the second cylinder and the outer circumference of the piston slide valve and produce a frictional damping during the displacement. In some aspects, the damping is performed such that the maximum movement frequency of the piston slide valve is below the stroke frequency of the piston. Also, the compressed gas may flow through a pneumatic restrictor.

In some other embodiments, devices are provided for sealing and inflating motor vehicle tires, which include a source of compressed gas, a compressor unit, which is formed as a reciprocating piston compressor driven by a slider crank mechanism and has a piston moved in an oscillating manner in a cylinder, wherein the piston and cylinder delimit a compression chamber and the cylinder is closed on the output side by a cylinder head with an outlet valve, and a second cylinder arranged in a guided, temperature-dependently displaceable piston slide valve which may be actuated by an actuator of a shape memory alloy. In some aspects, the piston slide valve can be displaced with the aid of a thermobimetal element, or by an electrical or electromechanical actuator. In some cases, the piston slide valve actuation can be controlled by a monitoring unit that can be activated by way of temperature sensors.

The reciprocating piston compressor may be provided with a variable dead air volume, the content of which can be varied depending on the temperature of the cylinder head. In some aspects, the dead air volume is provided by a pressure chamber which is connected to the compression chamber and the content of which can be varied depending on the temperature of the cylinder head.

In some aspects, the devices further include a pressure gage and a reservoir for an automatic sealant that can be filled into the inflatable tire and a valve-and-distributor unit for sealant and compressed gas, which connects the reservoir and the compressor unit and has a line that can be connected to the inflatable tire.

BRIEF DESCRIPTION OF THE DRAWINGS

Certain embodiments of the disclosure will hereafter be described with reference to the accompanying drawing, wherein like reference numerals denote like elements. It should be understood, however, that the accompanying FIGURE illustrates the various implementations described herein and are not meant to limit the scope of various technologies described herein, and FIG. 1 shows representations of details of a device according to the disclosure for sealing and inflating inflatable objects.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are devices for sealing and inflating inflatable objects in which the capacity of an air compressor is temporarily limited during operation, in order thereby to prevent overheating of important system components, though at the same time a high compressor power is to be available in operating states with low thermal loading. In some cases, the reciprocating piston compressor is provided with a variable dead air volume, the content of which can be varied depending on the temperature of the cylinder head.

In some embodiments, the device for sealing and inflating inflatable objects has as a source of compressed gas a compressor unit, which is formed as a reciprocating piston compressor driven by a slider crank mechanism and has a piston moved in an oscillating manner in a cylinder, and wherein the piston and the cylinder delimit a compression chamber and the cylinder is closed on the output side by a cylinder head with an outlet valve.

Some configurations according to the disclosure make possible limiting and controlling the capacity and also the temperature of a compressor unit or of an air compressor formed as a reciprocating piston compressor by a variably modifiable or activatable dead air volume.

With the aid of some configurations according to the disclosure, a highly efficient compressor can be made from plastic, containing a thermo-automatic power control to protect against overloading. The increase in the costs per unit as a result of the devices or control necessary for this is very low in comparison with a typical sealant compressor made of metal. The invention can be applied to any type of piston machine.

An advantageous development is that the device also has a reservoir for an automatic sealant that can be filled into the inflatable object and a valve-and-distributor unit for sealant and compressed gas, which connects the reservoir and the compressor unit and has a line that can be connected to the inflatable object. This allows the configuration according to the invention to be used for a compact breakdown kit, in which all of the devices required are arranged in a kit and can be operated by the user with few manipulations.

A further advantageous configuration is that the dead air volume is provided by a pressure chamber which is connected to the compression chamber and the content of which can be varied depending on the temperature of the cylinder head. This allows the dead air volume to be set independently of the form and configuration of the compression chamber. This is the case in particular in connection with a further advantageous configuration, which is that the further pressure chamber takes the form of a second cylinder, arranged in which is a guided, temperature-dependently displaceable piston slide valve.

The ways in which the control of the dead air volume thus provided may take place include electronically, for instance with the aid of a temperature sensor, an electronic control element, or else by an electromechanical actuator. The control of the dead air volume may also be performed by a central monitoring unit in dependence on the momentary operating state of the air compressor.

A further advantageous configuration is that the piston slide valve can be actuated by an actuator of a shape memory alloy. This provides a configuration that can be easily realized and permanently works dependably without further control measures and without an energy supply for this control task. The same applies to a further advantageous configuration, which is that the piston slide valve can be displaced by an actuator that is actuated with the aid of a thermobimetal element. With the size of this dead air volume and the design of the shape memory alloy, the reduction of the compressor power and the switching temperature $T_0$ can then be preselected or preset within the structural design. If the temperature of the cylinder head drops below the switching temperature $T_0$, then for example the piston slide valve closes and the compressor returns again to its normal operating state.

A further advantageous configuration is that the piston slide valve can be actuated by an electrical or electromechanical actuator, which is controlled by a monitoring unit that can be activated by way of temperature sensors. Among other things, the modification, control or activation of the dead air volume thus provided may then for example be electronically incorporated into already existing systems. The control of the dead air volume may also be performed by a central or decentralized monitoring unit in dependence on the momentary operating state of the air compressor that is determined by the central monitoring unit.

A further advantageous configuration is that the content of the dead air volume or pressure chamber can be increased to at least 5% of the compression chamber or compression volume. With a variable dead air volume of 10% of the compression volume, the volumetric flow can be reduced by up to 40% and the air temperature can be reduced by up to 70%, which of course also contributes to the desired thermal relief of the cylinder head. The electrical power consumption of the compressor with the dead air volume activated also decreases by up to 30%.

A further advantageous configuration is that the compressed gas flows from the compression chamber into the pressure chamber, i.e. into the dead air volume, in a damped manner, in particular flows through a pneumatic restrictor. This also allows pressure peaks from the cylinder forming the compression chamber to be damped.

A further advantageous configuration is that the damping is produced by the piston slide valve being frictionally displaced in the second cylinder, in particular by the piston slide valve being formed with sealing rings that are arranged between the inner wall of the second cylinder and the outer circumference of the piston slide valve and produce a frictional damping during the displacement. In this way it can be easily avoided that the activation of the dead air volume comes close to the stroke frequency of the piston. This is advantageous since the desired effect of the "activated" dead air volume is at a maximum when its content is approximately constant during the entire piston stroke.

A further advantageous configuration is that the damping is performed such that the maximum movement frequency of the piston slide valve is below the stroke frequency of the piston. This design prevents an uncontrolled oscillation of the system as a whole.

Some embodiments of the disclosure are explained in greater detail on the basis of an exemplary embodiment. FIG. 1 shows representations of details of a device for sealing and inflating inflatable objects, in particular for sealing and inflating motor vehicle tires. The device is shown in two switching states A and B, on the one hand with a non-activated dead air volume (A) on the left-hand side of FIG. 1 and on the other hand with an activated dead air volume (B) on the right-hand side of FIG. 1.

The device has as a source of compressed gas a compressor unit, which is formed as a reciprocating piston compressor 10 driven by a slider crank mechanism and has a piston 2 moved in an oscillating manner in a cylinder 1, wherein the piston 2 and the cylinder 1 delimit a compression chamber and the cylinder 1 is closed on the output side by a cylinder head 11 with an outlet valve 7.

The device also has a pressure gage 12 and a reservoir (not represented any more specifically here) for an automatic sealant that can be filled into the inflatable object and a valve-and-distributor unit for sealant and compressed gas, which connects the reservoir and the compressor unit and has a line that can be connected to the inflatable object, wherein the valve-and-distributor unit allows the device to be operated according to choice in the two operating modes "inflate" and "feed sealant". The valve-and-distributor unit is usually connected to the air outlet 3 and is likewise not represented any more specifically in FIG. 1.

The reciprocating piston compressor 10 is provided with a variable dead air volume, the content of which can be varied depending on the temperature of the cylinder head. In the embodiment shown, the variable dead air volume is provided by an additional chamber, to be specific by a pressure chamber 9 which is connected to the compression chamber and the content of which can be varied or activated. In the compression chamber there is only a small, type-dependent dead air volume 8 between the piston 2 and the cylinder 1. A periodic piston movement has the effect that an air stream is transported through the air outlet 3 by way of the outlet valve 7 on the basis of the known principle.

In this operating mode, the efficiency of the compressor is not impaired. In the normal state, the temperature of the cylinder head is thus below a switching temperature $T_0$.

The pressure chamber 9 takes the form of a second cylinder 13, arranged in which is a guided displaceably movable piston slide valve 4, which is acted upon by the actuator 5. The adjusting or biasing of the actuator 5 is performed by means of the adjusting device 6. If as a result of an unusually high loading of the compressor the cylinder head temperature then increases beyond the switching temperature $T_0$, the length of the actuator 5, produced here from a shape memory alloy (SMA), is reduced and moves the piston slide valve 4, as shown on the right-hand side of FIG. 1 (B).

In the embodiment shown here, the content of the dead air volume or pressure chamber 9 can be increased to a size/a volume of 10% of the compression chamber or compression volume.

The present embodiment of the subject matter of the disclosure therefore influences or controls the volumetric flow, and consequently retroactively the temperature, of the air compressor by a variable, activatable dead air volume, in that the movement of the piston slide valve 4 has the effect of opening an additional chamber that is connected to the cylinder or an additional pressure chamber 9.

In this case, the piston slide valve 4 and/or the supply line to the slide valve is/are designed such that pressure peaks from the cylinder are damped and do not cause opening of the slide valve. Furthermore, the damping of the piston slide valve 4 is chosen such that the maximum movement frequency of the slide valve is well below the stroke frequency of the piston. This design prevents uncontrolled oscillation of the system.

Frictional sealing rings 14 are arranged here between the inner wall of the second cylinder 13 and the outer circumference of the piston slide valve 4.

The chamber that is then open toward the compression cylinder 1, i.e. the pressure chamber 9, serves as a dead air volume for controlling the power of the compressor. With for example a variable dead air volume of 10% of the compression volume, in the present example the outlet temperature can be reduced by up to 70%. The electrical power consumption of the compressor with the dead air volume activated also decreases by up to 30%.

If the temperature of the cylinder head drops below the switching temperature, $T_0$, the piston slide valve 4 closes and the compressor returns again to its normal operating state.

LIST OF REFERENCE SIGNS (PART OF THE DESCRIPTION)

1 Cylinder/compression cylinder
2 Piston
3 Air outlet
4 Piston slide valve
5 Actuator made of shape memory alloy (SMA)
6 Adjusting device
7 Outlet valve
8 Minimum dead air volume
9 Variable dead air volume/pressure chamber
10 Reciprocating piston compressor
11 Cylinder head
12 Pressure gauge
13 Second cylinder
14 Frictional sealing rings The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

We claim:

1. A device for sealing and inflating inflatable objects, the device comprising:
    a source of compressed gas; and,
    a compressor unit made from plastic, which is formed as a reciprocating piston compressor driven by a slider crank mechanism and has a piston moved in an oscillating manner in a cylinder, wherein the piston and the cylinder delimit a compression chamber and the cylinder is closed on the output side by a cylinder head with an outlet valve;
    wherein a dead air volume is provided by a pressure chamber which is connected to the compression chamber and the content of which can be varied depending on the temperature of the cylinder head;
    wherein the reciprocating piston compressor is provided with a variable dead air volume, the content of which can be varied depending on the temperature of the cylinder head and the content of which provides thermal relief for the cylinder head;
    wherein a further pressure chamber takes the form of a second cylinder arranged in a guided, temperature-dependently displaceable piston slide valve; and,
    wherein the piston slide valve can be actuated by an actuator of a shape memory alloy, or wherein the piston slide valve can be displaced by an actuator that is actuated with a thermobimetal element.

2. The device as claimed in claim 1 further comprising a pressure gage and a reservoir for an automatic sealant that can be filled into the inflatable object and a valve-and-distributor unit for sealant and compressed gas, which connects the reservoir and the compressor unit and has a line that can be connected to the inflatable object.

3. The device as claimed in claim 1, wherein the content of the dead air volume or pressure chamber can be increased to at least 5% of the compression chamber.

4. The device as claimed in claim 1, wherein the compressed gas flows from the compression chamber into the pressure chamber in a damped manner.

5. The device as claimed in claim 4, wherein the damping is produced by the piston slide valve being frictionally displaced in the second cylinder.

6. The device as claimed in claim 5, wherein the damping is produced by the piston slide valve being formed with sealing rings that are arranged between the inner wall of the second cylinder and the outer circumference of the piston slide valve and produce a frictional damping during displacement.

7. The device as claimed in claim 4, wherein the damping is performed such that a maximum movement frequency of the piston slide valve is below a stroke frequency of the piston.

8. The device as claimed in claim 4, wherein the compressed gas flows through a pneumatic restrictor.

9. The device as claimed in claim 1, as used for sealing and inflating motor vehicle tires.

* * * * *